Nov. 17, 1964     F. K. H. NALLINGER     3,157,104
VENTILATING OR AIR-CONDITIONING SYSTEM FOR VEHICLES
Filed May 15, 1961
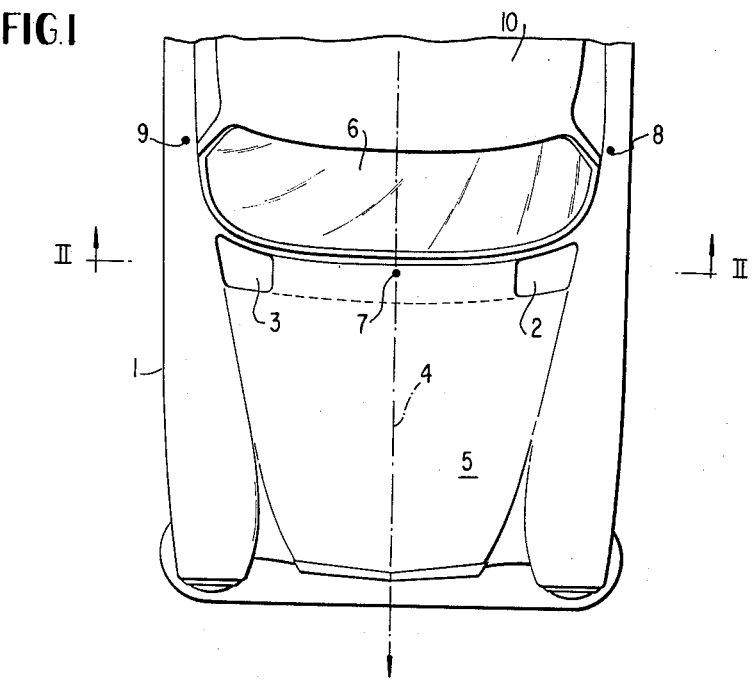
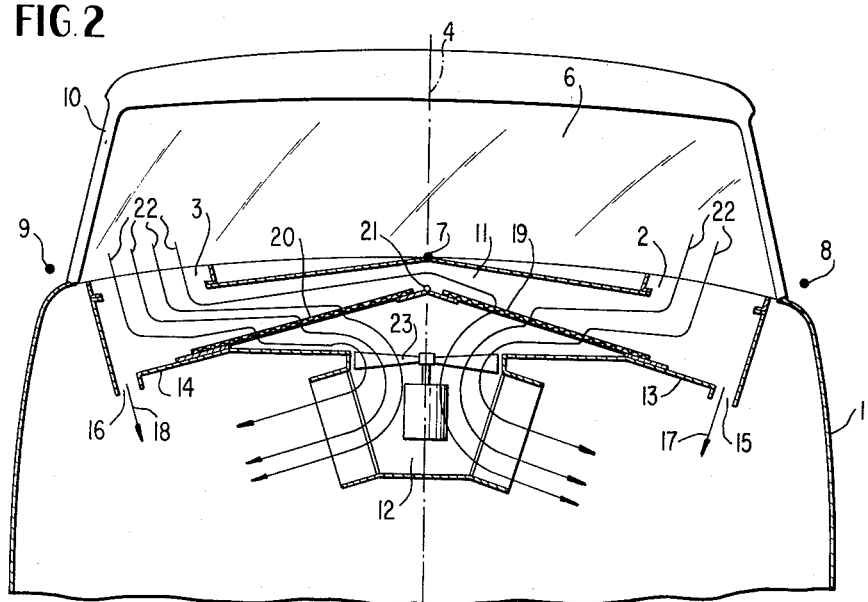
INVENTOR.
FRIEDRICH K. H. NALLINGER
BY Dicke & Craig
ATTORNEYS United States Patent Office 3,157,104
Patented Nov. 17, 1964

3,157,104
VENTILATING OR AIR-CONDITIONING SYSTEM
FOR VEHICLES
Friedrich K. H. Nallinger, Stuttgart, Germany, assignor to Daimler-Benz Aktiengesellschaft, Stuttgart-Unterturkheim, Germany
Filed May 15, 1961, Ser. No. 110,220
Claims priority, application Germany May 19, 1960
7 Claims. (Cl. 98—2)

The present invention relates to a ventilating or air-conditioning system for vehicles and especially for automobiles.

Prior to this invention it has been customary for attaining a fully adequate ventilation of the interior of a vehicle to provide the air inlets for a ventilating or air-conditioning system at such points of the vehicle where the relative wind produces a high pressure head. Thus, for example, in passenger cars the air inlets were usually provided adjacent to the central vertical longitudinal plane of the car and directly in front of the windshield. The arrangement of the air inlets in such a position has, however, the disadvantage that the rate of air passing into these inlets and thus also the heating or cooling effect produced by the ventilating or air-conditioning system depend upon the speed of the vehicle. Furthermore, most of the customary air inlets which are centrally disposed on a car are rather inaccessible from the sides of the car and can therefore be cleaned only with considerable difficulties. Such central air inlets also have the disadvantage that it is difficult to provide them with means for separating rain water from the entering air and for draining such water from the car.

It is an object of the present invention to provide a ventilating and air-conditioning system for vehicles and especially automobiles which overcomes the above-mentioned disadvantages and comprises one or more air inlets in a position where the static pressure depends very little or not at all upon the vehicle speed. The air inlets may for this purpose be placed in front of the windshield near the lateral ends thereof. It has been found to be of particular advantage if two air inlets are provided symmetrically to the central vertical longitudinal plane of the vehicle and are connected to each other by an air channel which, in turn, is connected by a central outlet or channel to the other components of the ventilating or air-conditioning system.

In order to improve the dehydration of the air entering into the inlets, it is advisable to design the bottom plates of the transverse connecting channel between the air inlets so that at least the outer parts thereof are upwardly inclined toward the longitudinal center of the vehicle. For draining the separated water from the air inlets and from the car, these bottom plates may be provided with apertures at their lowest points and preferably below the air inlets.

Another feature of the invention consists in providing dust or gas filters or both within the transverse connecting channel and preferably in such a manner that the pressure within the different parts of the channel will be equalized if the car is driven in a crosswind and the air currents do not enter the two inlets symmetrically. Such a pressure equalization is improved particularly if the filters are mounted in alignment with the ascending outer portions of the bottom plates of the transverse connecting channel and if they meet within a zenithal line which lies within the central vertical longitudinal plane of the vehicle.

The above-mentioned and additional objects, features, and advantages of the present invention will become more clearly apparent from the following detailed description thereof which is to be read with reference to the accompanying drawings, in which—

FIGURE 1 shows a plan view of the front part of a car which is provided with a ventilating or air-conditioning system according to the invention; while FIGURE 2 shows a cross section taken along line II—II of FIGURE 1.

Referring to the drawings, the automobile 1 is equipped with a ventilating or air-conditioning system which comprises air inlets 2 and 3 which are arranged symmetrically to the central vertical longitudinal plane 4 of the vehicle within the engine hood 5 directly in front of the windshield 6 and adjacent to the lateral ends of the latter.

When a vehicle is being driven against a headwind, an increased air pressure is produced especially at a point 7 within the central longitudinal plane of the vehicle and directly in front of the windshield 6, whereas a negative pressure is built up at the points 8 and 9 laterally of the passenger compartment 10. Thus, at each side of the vehicle there must be a place between the points 7 and 8 or 7 and 9 where the static pressure depends very little or not at all upon the driving speed. According to the invention, the air inlets 2 and 3 are provided at these points which are located near the outer walls of vehicle 1 in front of the windshield 6, so that the rate of air flow and the heating or cooling efficiency of the ventilating or air-conditioning system according to the invention will be entirely or almost entirely independent of the driving speed of the vehicle.

As illustrated particularly in FIGURE 2, the air inlets 2 and 3 are connected with each other by a transverse channel 11. Within an area adjacent to the central longitudinal plane 4 of the vehicle, channel 11 is provided with or connected to a central outlet or channel 12 which leads to the other parts of the ventilating or air-conditioning system. The outer parts 13 and 14 of the bottom plate of the transverse connecting channel 11 are upwardly inclined toward the central longitudinal plane 4 of the vehicle. The lowest points of channel 11 are provided with apertures 15 and 16 through which any water which has been separated from the entering air currents will be drained in the direction of arrows 17 and 18. In alignment with the outer upwardly inclined parts 13 and 14 of the bottom plate of the transverse channel 11 this channel has also mounted therein large-surface dust and gas filters 19 and 20 which are connected to each other at a zenithal line 21 which lies within the central longitudinal plane 4 of the vehicle. The inventive arrangement of the channels and filters produces in a very simple manner an equalization of pressure if the air flow at the air inlets 2 and 3 is unsymmetrical and different pressures occur in them, for example, at a crosswind. An example of the flow conditions which may then occur is indicated by the arrows 22 in FIGURE 2.

Another very important advantage which is attained by the present invention is the fact that the lateral air inlets 2 and 3 are much more easily accessible than those previously used in cars which were located at the central point 7. Especially when they are covered up by snow or slush, these lateral air inlets 2 and 3 may be much more easily cleaned than a central air inlet which can hardly be reached from the sides of the car. Since the transverse connecting channel 11 is also easily accessible after the engine hood 5 has been opened, it is also easily possible to clean this channel as well as the filters 20 therein.

The central part 12 of the air channel contains a blower 23 which permits the ventilation of the interior of the car to be increased in the event that, for example, at a low driving speed, the air does not enter normally through inlets 2 and 3 at a sufficient pressure.

Although the invention has been illustrated and described with reference to the preferred embodiments thereof, it should be understood that it is in no way limited to the details of such embodiments but is capable of numerous modifications within the scope of the appended claims.

The invention having now been fully disclosed, what is claimed is:

1. Ventilating apparatus for a vehicle having a vehicle body including a passenger compartment, and a windshield, means forming a pair of air inlet openings through said body, said air inlet openings being provided essentially directly in front of and closely adjacent to lateral ends of said windshield in regions of said body between the high positive pressure point within the central longitudinal plane of the vehicle in front of the windshield and the points of highest negative pressure on either side of the vehicle laterally of the passenger compartment where the entering air pressure is essentially independent of the velocity of the vehicle, the surface of the body containing said air inlet openings being essentially parallel to the direction of air flow along said vehicle body in the vicinity of said inlet openings, channel means connecting said inlet openings with the interior of said vehicle and means within said channel means for equalizing any pressure differential between the air flow from the pair of air inlet openings.

2. Ventilating apparatus for a vehicle having a vehicle body including a passenger compartment, and a windshield, means forming a pair of air inlet openings through said body adjacent said windshield in regions of said body between the high positive pressure point within the central longitudinal plane of the vehicle in front of the windshield and the high negative pressure points on either side of the vehicle laterally of the passenger compartment where the entering air pressure is essentially independent of the velocity of the vehicle, the surface of the body containing said air inlet openings being essentially parallel to the direction of air flow along said vehicle body in the vicinity of said inlet openings, and means to convey air from said inlet openings to the interior of said vehicle.

3. Ventilating apparatus for a vehicle having a vehicle body including a passenger compartment, and a windshield, means forming a pair of air inlet openings through said body essentially directly in front of and closely adjacent to lateral ends of said windshield in regions of said body between the high pressure point within the central longitudinal plane of the vehicle in front of the windshield and the points of highest negative pressure on either side of the vehicle laterally of the passenger compartment where the entering air pressure is essentially independent of the velocity of the vehicle, blower means within said body for discharging air into the interior of said vehicle, and channel means connecting said inlet openings and said blower means for effecting an equalization of a pressure differential between said air inlet openings so as to provide a steady supply of air to said blower means.

4. Ventilating apparatus for supplying air to the passenger compartment of a motor vehicle having a vehicle body and a windshield, said vehicle body including an engine hood in front of said windshield, said hood being provided with a pair of inlet openings disposed symmetrically to the longitudinal plane of the vehicle and substantially in front of the lateral end portions of said windshield in regions where the air pressure is essentially independent of the velocity of the vehicle, transverse air channel means beneath said hood connecting said air inlet openings with each other, said hood forming an upper wall portion of said channel means, and means for discharging air from said channel means into said passenger compartments.

5. Ventilating apparatus as defined in claim 4, wherein said channel means include bottom plate portions disposed below said air inlet openings and upwardly inclined toward the longitudinal plane of said vehicle to assist in separating moisture from incoming air, and further comprising moisture discharge apertures positioned adjacent said bottom plate portions.

6. Ventilating apparatus for a vehicle having a vehicle body and a windshield, said vehicle body being provided with a pair of air inlet openings disposed symmetrically in front of and closely adjacent to the opposite lateral end portions of said windshield, a transverse air channel within said vehicle connecting said air inlet openings with each other and being provided with common discharge aperture means for said air inlet openings, and means within said air channel for equalizing any pressure differential between the air flow from the air inlet openings, said last mentioned means including air filter means overlying said common discharge aperture means and closing off only a portion of said air channel.

7. Ventilating apparatus for a vehicle having a vehicle body and a windshield, said vehicle body being provided with a pair of air inlet openings disposed symmetrically in front of and closely adjacent to the opposite lateral end portions of said windshield, a transverse air channel within said vehicle connecting said air inlet openings with each other and with a common discharge aperture means located at the midpoint of said transverse channel, blower means in communication with said common discharge aperture means for drawing air through said air inlet openings and said air channel and for discharging air into the interior of the vehicle via said common discharge aperture means.

References Cited in the file of this patent

UNITED STATES PATENTS

| | | |
|---|---|---|
| 1,905,487 | Modine | Apr. 25, 1933 |
| 2,221,891 | Young | Nov. 19, 1940 |
| 2,230,809 | Lintern | Feb. 4, 1941 |
| 2,864,299 | Betts | Dec. 16, 1958 |
| 2,975,696 | Jewell | Mar. 21, 1961 |

FOREIGN PATENTS

| | | |
|---|---|---|
| 295,346 | Great Britain | Aug. 9, 1928 |
| 1,165,665 | France | Jan. 23, 1957 |